United States Patent [19]

Linkner

[11] Patent Number: 5,540,486
[45] Date of Patent: Jul. 30, 1996

[54] ANTI-LOCK BRAKE SYSTEM NOISE ATTENUATOR

[75] Inventor: Herbert L. Linkner, Dexter, Mich.

[73] Assignee: Kelsey-Hayes Company, Livonia, Mich.

[21] Appl. No.: 163,658

[22] Filed: Dec. 7, 1993

[51] Int. Cl.$^6$ ............... B60T 17/06; F16L 55/04
[52] U.S. Cl. ............ 303/87; 303/10; 303/116.1; 137/568; 138/30
[58] Field of Search ............ 137/568, 593; 138/28, 30; 188/152; 303/10, 11, 87, 115.4, 116.1, 116.7, 900, 119.2, 116.4

[56] References Cited

U.S. PATENT DOCUMENTS

| | | | |
|---|---|---|---|
| 3,757,825 | 9/1973 | Givens et al. | 303/87 X |
| 4,453,782 | 6/1984 | Arikawa et al. | 303/115.4 X |
| 4,571,009 | 2/1986 | Jones | 303/87 |
| 4,828,335 | 5/1989 | Fuller et al. | 303/100 |
| 5,066,075 | 11/1991 | Kaneda et al. | 303/115.4 X |
| 5,096,400 | 3/1992 | Budecker et al. | 417/540 |
| 5,143,428 | 9/1992 | Toda et al. | 303/900 |
| 5,209,554 | 5/1993 | Beilfuss et al. | 303/116.1 |
| 5,232,273 | 8/1993 | Eckstein et al. | 303/116.4 |
| 5,244,262 | 9/1993 | Kehl et al. | 303/119.2 |
| 5,271,667 | 12/1993 | Takata et al. | 303/113.2 |

FOREIGN PATENT DOCUMENTS

| | | | |
|---|---|---|---|
| 0491159A1 | 11/1991 | European Pat. Off. . | |
| 1373140 | 12/1964 | France | 303/87 |
| 1963709 | 7/1971 | Germany | 138/30 |
| 4029846 | 4/1991 | Germany | 303/87 |
| 4002635 | 8/1991 | Germany | 303/900 |
| 4128386 | 3/1993 | Germany . | |
| 1106759 | 4/1989 | Japan | 303/116.1 |

OTHER PUBLICATIONS

Fluid Technology—Accumulators, pp. 360 and 361, pre Dec. 7, 1993.

*Primary Examiner*—Robert J. Oberleitner
*Assistant Examiner*—Alfred Muratori
*Attorney, Agent, or Firm*—Brooks & Kushman PC

[57] ABSTRACT

A hydraulic control unit for a vehicle anti-lock brake system is disclosed which comprises a bore defining a chamber symmetrical about an axis and having a sidewall and a bottom wall. A fluid inlet passage is open to the bore from one of the walls and a damping orifice of substantially restricted diameter relative to the inlet passage is in open communication with the inlet passage. An attenuator is seated within the chamber and is sealed relative to the chamber to preclude the flow of brake fluid from the control unit. The attenuator includes a compressibly deformable solid core member that substantially fills the chamber. Also, there is provided a clearance relationship between the attenuator and chamber walls thereby exposing the attenuator on all sides to brake fluid pressure from the inlet passage whereby, as the pressure of the brake fluid within the hydraulic control unit fluctuates, the compressible attenuator core member absorbs the fluid pressure pulses, and thereby allows the damping orifice to attenuate the pressure pulses to the system.

5 Claims, 3 Drawing Sheets

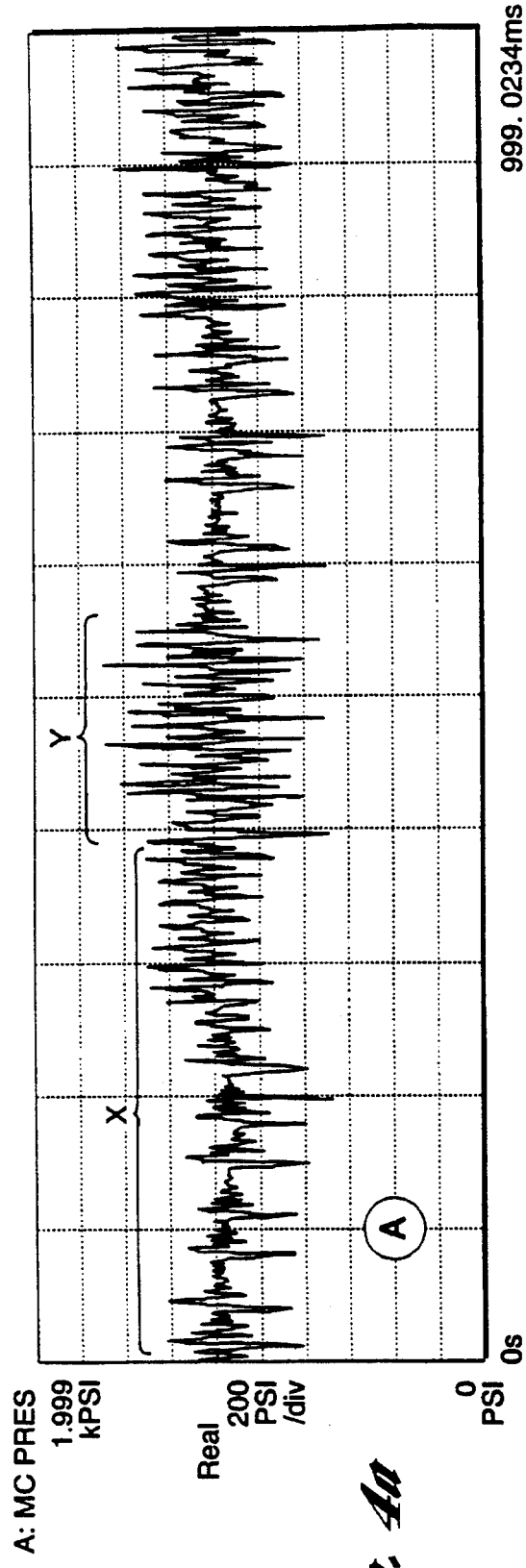
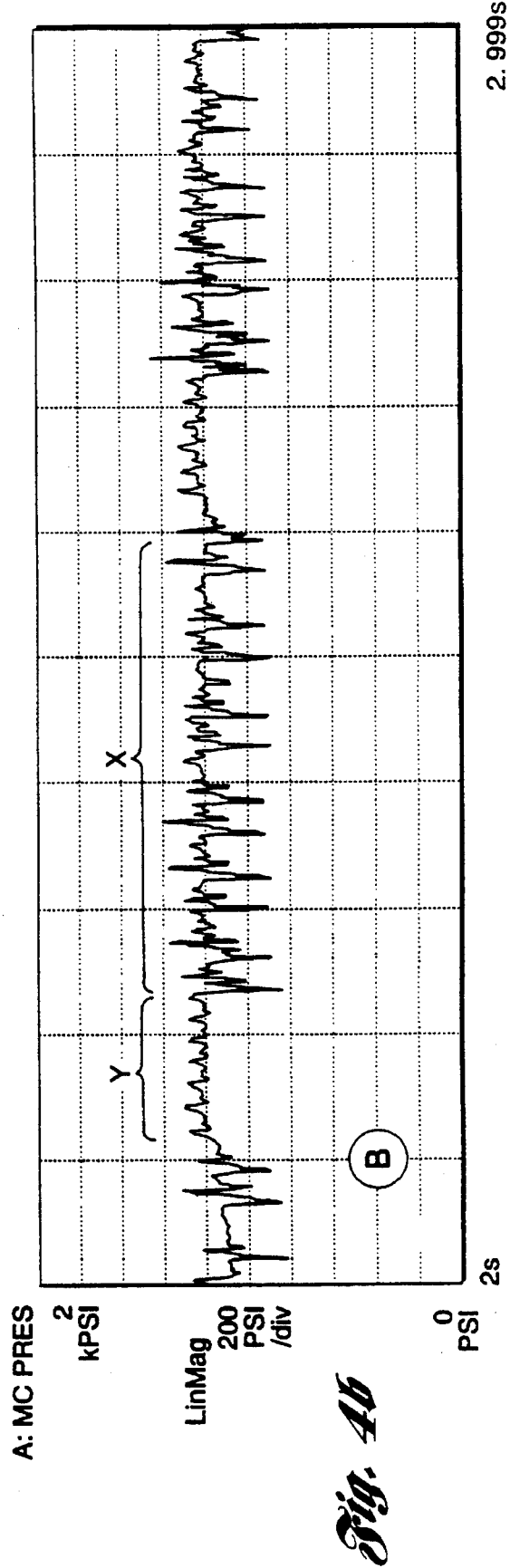
Fig. 4a
Fig. 4b

ANTI-LOCK BRAKE SYSTEM NOISE ATTENUATOR

TECHNICAL FIELD

The invention relates to the design of attenuators used for reducing the amplitude of pressure fluctuations in hydraulic fluid lines, and particularly, the design of attenuators used in vehicular anti-lock brake systems and their use in such systems.

BACKGROUND ART

The use of fluid-filled attenuators in vehicular braking systems is well known. Their use is particularly prevalent in anti-lock brake systems (ABS) at the outlet end of the ABS hydraulic pump used to generate the supplemental brake fluid pressure required to actuate the brakes at the wheel cylinders through the ABS hydraulic control unit and independently of the brake pedal being actuated by the operator. The attenuator assists in significantly reducing the amplitude of the brake fluid high energy pressure pulses at the output end of the pump, thereby helping to eliminate or substantially reduce the mechanical noise hydraulically generated in the braking system and sounding through the master cylinder or its connection to the vehicle. These pressure spikes can be in the order of 900–1000 psi. Use of a conventional attenuator at the output end of the ABS pump will reduce these spikes to about 100–300 psi.

A conventional attenuator, as assembled, basically has no moving parts. It basically comprises a closed chamber filled with brake fluid having an inlet from the output side of the pump and an outlet in an orifice of substantially reduced diameter. Because of the restriction of flow through the orifice, the pressure fluctuations are attenuated as a result of the compressibility of the brake fluid itself. i.e. absorbing the high energy fluid pulses and slowly releasing it through the orifice.

A conventional attenuator used for this purpose is as shown in FIG. 3 herein and described in the detailed discussion appearing below. One notes that the conventional attenuator is of significant axial length as is required to (i) facilitate several O-ring seals confining the brake fluid to the attenuator and assuring its prescribed flow through the attenuator, and (ii) assure the isolation of the incoming fluid to the attenuator reservoir and through the outlet orifice, thereby avoiding any short circuiting of the function of the attenuator. This conventional design also requires a bleed port and fitting for allowing a means of eliminating entrapped air from the brake fluid line. It also requires a compression spring for maintaining the attenuator cylinder firmly against a retaining clip, holding the cylinder in fixed position relative to the hydraulic control unit.

SUMMARY OF THE INVENTION

The present invention contemplates substantially reducing the overall length of the attenuator without sacrificing in any way the performance of the attenuator.

The invention further contemplates substantially reducing the number of components needed to construct the attenuator, thereby reducing cost, improving assembly technique and product reliability.

The invention further contemplates eliminating the need to bleed the attenuator of entrapped air by eliminating the fluid-filled reservoir which created the opportunity for entrapment of air.

The invention further contemplates a hydraulic control unit for a vehicle anti-lock brake system comprising a bore defining a chamber symmetrical about an axis and having a sidewall, a bottom wall and a fluid inlet passage open to the bore from the bottom wall. A damping orifice of substantially restricted diameter relative to the inlet passage is in open communication with the inlet passage adjacent the bottom wall. An attenuator is seated within the chamber and sealed relative to the chamber to preclude the flow of brake fluid from the chamber. The attenuator includes a volumetrically compressible solid core member substantially filling the chamber. There is provided a clearance relationship between the attenuator and chamber walls thereby exposing the attenuator at all sides to brake fluid pressure from the inlet passage, whereby as the pressure of the brake fluid within the hydraulic control unit fluctuates, the compressible attenuator core member absorbs the fluid pressure pulses, thereby allowing the damping orifice to attenuate the pressure pulses to the system.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a graphical presentation of test results demonstrating the ability of an attenuator, as constructed in accordance with the present invention and as constructed in accordance with conventional attenuators, to eliminate high energy pressure pulses in the brake fluid at key points along the system and thereby reduce mechanical noise attributable to these pressure fluctuations.

BEST MODE FOR CARRYING OUT THE INVENTION

Figure 1:
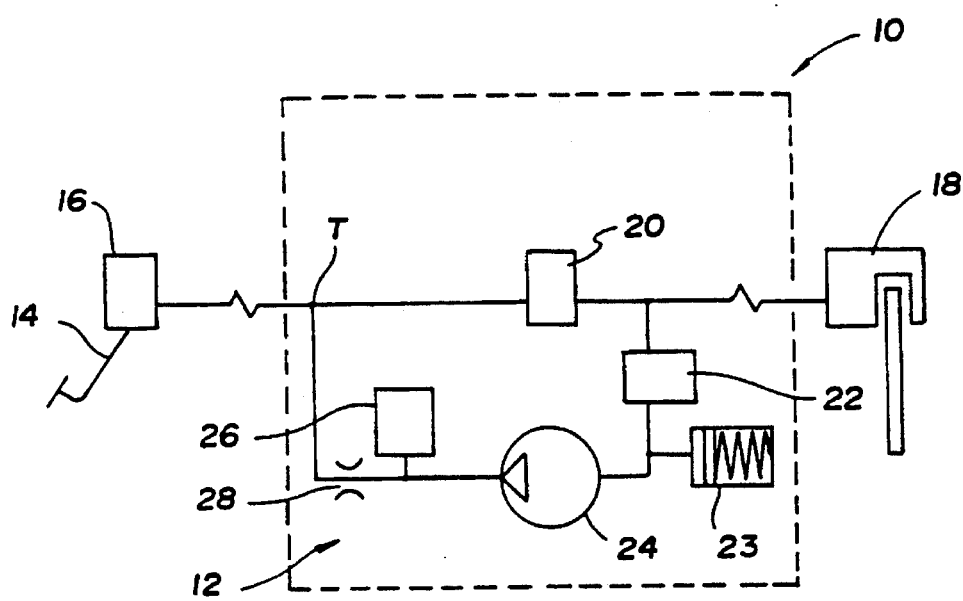
FIG. 1 is a schematic representation of a vehicular braking system as know in the prior art including an anti-lock braking unit as part of the system.

As seen in the schematic diagram of FIG. 1, it is common practice to include in a conventional braking system, generally designated 10, an anti-lock braking unit generally designated 12. The braking system 10, exclusive of the ABS unit 12, includes a brake pedal 14 acting on a master cylinder 16 to provide brake fluid under pressure to a slave cylinder 18 of a wheel brake assembly, e.g. a disc brake as shown. The ABS unit 12 includes an isolation valve 20, hold/dump valve 22, low pressure accumulator 23, pump 24, attenuator 26 and orifice 28. During normal braking (i.e. no wheel lock-up), the operator applies foot pressure to the brake pedal 14 causing the master cylinder 16 to provide brake fluid under pressure through the isolator valve 20 to slave brake cylinder 18, thereby providing driver modulated or controlled braking of one of the vehicle wheels through this brake.

If a brake locking condition is sensed at the brake by a sensor (not shown), the solenoid actuated isolation valve 20 is closed to prevent further increase of brake pressure. The solenoid actuated hold/dump valve 22 is then opened as needed to reduce brake pressure by allowing flow into the low pressure accumulator 23. The pump 24 pumps fluid from the low pressure accumulator to the inlet side of the isolation valve 20. Upon lock-up ceasing, the hold/dump valve 22 is closed and the isolation valve 20 is opened as needed whereby high pressure fluid is again applied to the controlled brake 18.

Figure 2:
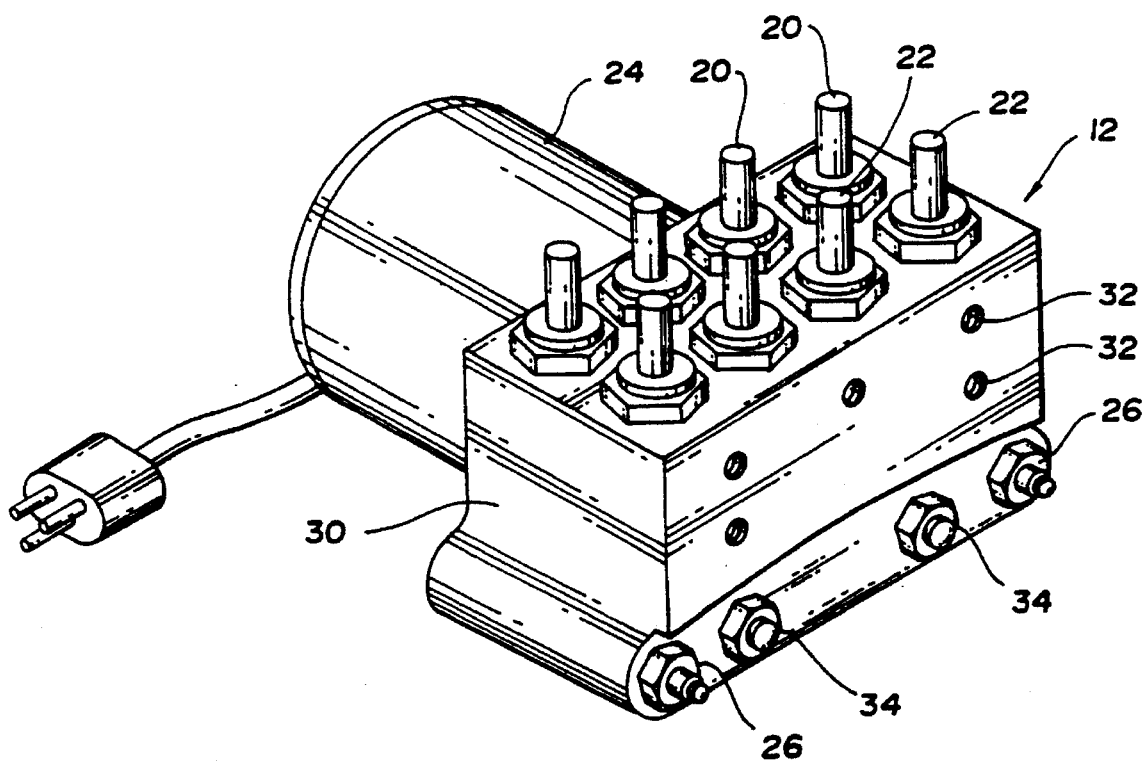
FIG. 2 is a perspective view of a conventional hydraulic control unit as known in the prior art.

In FIG. 2, there is shown a conventional hydraulic control unit generally designated 12. It includes a valve body housing 30. Located on one wall of the housing is electrically driven pump 24. Extending from another wall is a plurality of isolation valves 20 and hold/dump valves 22, generally one each for each wheel of the vehicle. Shown in the drawing is the solenoid pin portion of the solenoid actuated isolation valves 20 and hold/dump valves 22 in axial alignment with the actual valves themselves. Extending from yet another wall of the housing 30 is a plurality of brake lines 32 leading either to the slave cylinders 18 of each wheel or leading to the master cylinder 16. Extending from the same wall are several attenuators 26, one for the two wheels located on one line and the other for the remaining two wheels located on the other line as fed by a conventional two chamber master cylinder 16. Also extending from the same wall are several low pressure accumulators 34. Most of the aforementioned elements have been described above in connection with FIG. 1, and like reference numerals have been used.

Figure 3:
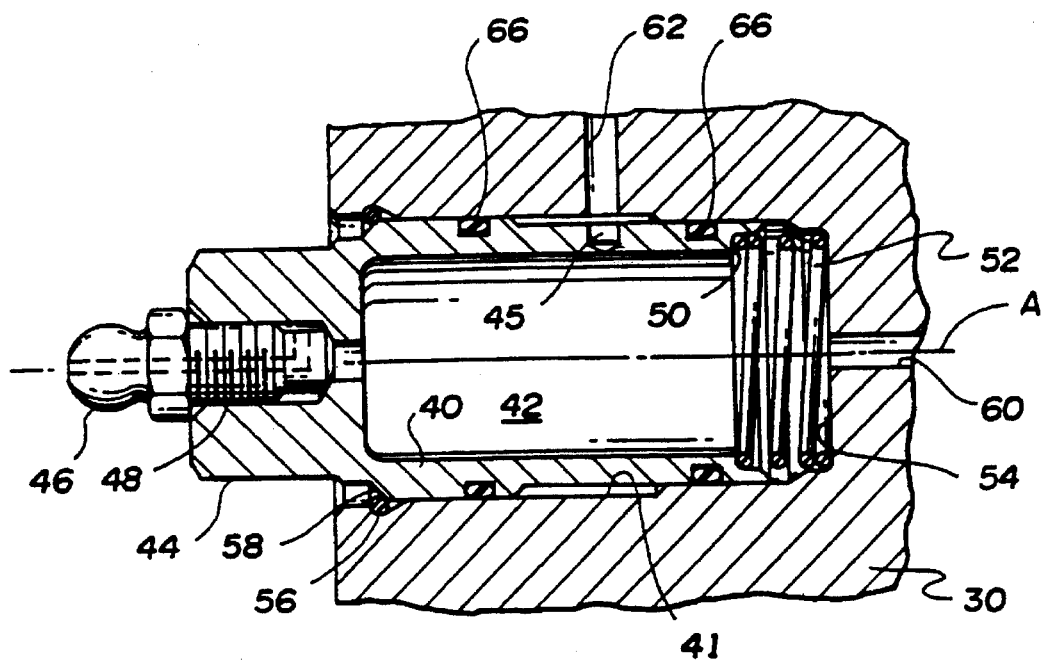
FIG. 3 is an elevational view in cross-section showing a conventional attenuator as known in the prior art.

Conventionally, as seen in FIG. 3, the attenuator is comprised of a cylinder 40 received in sliding engagement within a bore 41 of the control unit housing 30 and having a counterbore creating a reservoir 42 enclosed at its exterior end by head member 44. The cylinder includes an orifice 45 extending through the cylinder wall approximately midway of the axial length of the brake fluid filled reservoir 42. Concentrically located therein is a bleed screw 46 threaded within a bleed screw counterbore 48 and communicating with the brake fluid-filled reservoir 42 defined by the main counterbore. At its open end, the cylinder includes a third counterbore 50 which forms a seat upon which a compression spring 52 is seated bearing against a bottom wall 54 of the main chamber within the hydraulic control unit and maintaining the cylinder biased in compression against the annular retainer clip 56. The retainer clip 56 is seated within a groove formed within the hydraulic control unit and bearing against a retainer shoulder 58 located about the circumference of the cylinder. The hydraulic control unit housing 30 further includes an inlet passage 60 concentrically located relative to the cylinder along an axis A, and further including an outlet passage 62. There is further provided an annular chamber 64 extending about the circumference of the cylinder between the cylinder and the hydraulic control unit housing 30 to provide fluid flow from reservoir 42, through orifice 45 and outlet passage 62 back to the fluid line extending between the master cylinder 16 and isolation valve 20. O-ring seals 66 at either end of the chamber 64 assure that no brake fluid leaks beyond the confines of chamber 64.

In FIG. 4, there is demonstrated the overall effectiveness of the attenuator 26 in damping pressure pulses. The test results shown in FIG. 4 show in Graph A pressure pulses through one cycle of the pump 24 when the attenuator 26 is not included in the system. Graph B shows the same pump cycle in a substantially identical ABS system with the attenuator 26 included within the system. In Graph A, it will be noted that the pressure pulses Y during the time the pump is on set up high energy fluid pressure spikes in the order of magnitude of approximately 900–1000 pounds per square inch (psi). Looking at Graph B, it is noted that the same pressure spikes are reduced in amplitude to approximately 100 psi when the attenuator 26 is in the system. These pressure pulses were measured at the point T as shown in FIG. 1. The remaining portions of Graphs A and B, as designated X, show fluid pressure pulses generated at the inlet end of isolation valve 20. The magnitude of these pulses is not nearly as significant as the pump generated pulses.

Figure 5:
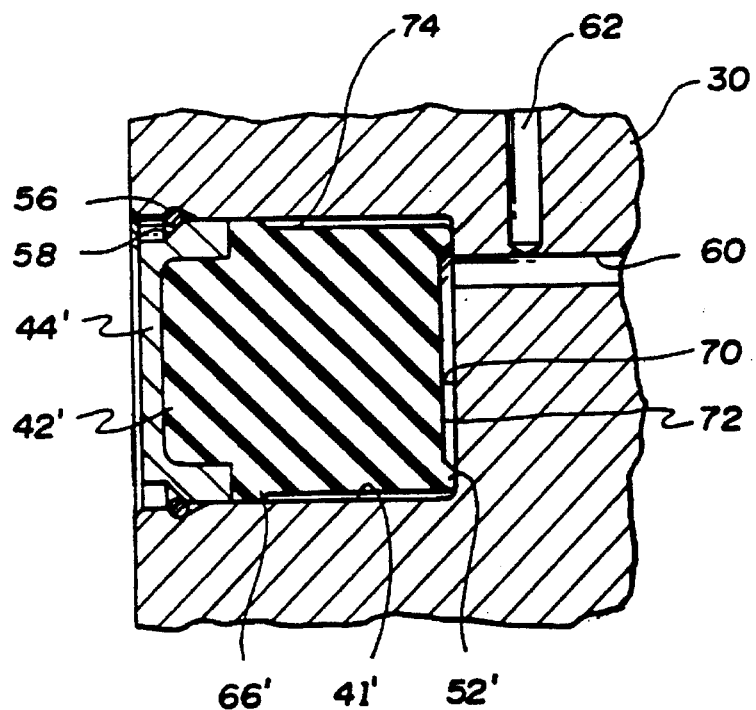
FIG. 5 is an elevational view shown in cross-section of an attenuator in accordance with the present invention.

In FIG. 5, there is shown the attenuator 26 in accordance with the present invention. Like reference numerals are used to illustrate features identical to those of FIG. 4, whereas numerals having a prime sign indicate functionally equivalent features. Attenuator 26 includes an elastomer core piece 42' which serves as the working fluid and replaces the brake fluid of the conventional design as shown in FIG. 4. This design takes advantage of the fact that the bulk modulus of compressibility of a chosen i.e., its volumetric compressibility, is the same or substantially the same as that of brake fluid, and consequently it provides the same performance per unit of working fluid volume as that of brake fluid. The bulk modulus of compressibility of elastomer and brake fluid is approximately 415,000 psi. Thus, the volume of the core piece 42' is the same as that of the brake fluid within the reservoir 42 of the conventional design shown in FIG. 3. However, since the cylinder 40 can now be eliminated from the design considerations, the overall axial length or depth of the housing bore 41 in accordance with the present invention can be considerably reduced from that of the conventional design shown in FIG. 3. Further, the elastomer core piece 42 can be molded so as to include an annular seal rib 66' at the head end 44' of the attenuator and an axially extending annular compression rib 52' at its opposite end. The seal rib 66' has an exposed shape complementary to that of O-ring 66, i.e. cylindrical in cross-section, and replaces the need for any separate O-rings as shown in the conventional design, and the axially extending compression rib 52' supplements the compression spring 52 of the conventional design.

Further, since the amount of brake fluid needed to "fill" the attenuator has been significantly reduced, there is no need for a bleed screw. In my preferred embodiment, approximately 97% of the trapped air of the attenuators is eliminated. This then allows that the relatively rigid end cap 44' or head of the attenuator may be reduced to a small aluminum button. Further, as a subassembly, the end cap 44' and elastomer core member 42' may be molded as a single integral member. Therefore, in accordance with the present invention, (i) the overall volume of the attenuator within the hydraulic control unit has been substantially reduced, (ii) the bleed screw, cylinder, O-rings and compression spring have been eliminated, and (iii) installation has been simplified to the insertion of the integral end cap and elastomer core piece being held in place by a retainer clip 56. The damping orifice 45 may be constructed as part of the outlet passage and be located within and in direct communication with the inlet passage 60 adjacent the bottom wall 70 of the housing bore 41'. The axial compression rib 52' will hold the remaining portion of the end wall 72 of the elastomer core piece from the housing bottom wall 70, thereby creating a brake fluid reservoir of substantial core surface area upon which the force of the high energy pressure pulses may act and be absorbed.

It is further shown that there may be some clearance 74 between the outer wall of the elastomer core piece intermediate the ribs 52', 66' and the side-wall of the housing bore 41'. This assures the ability of the elastomer to be compressed by the brake fluid filling the clearance 74 when the system is operational. It also assures that the core piece will have somewhere to go when subjected to installation forces, i.e. when the core piece and end cap unit are being installed, depressing the ribs 52' and allowing the retainer clip 56 to be put in place within the housing. Clearance 74 also allows a line contact seal between seal rib 61' and bore 41'.

Optionally, one could provide that the inlet passage 60 communicates with some other portion of the attenuator and housing bore other than at its bottom wall 70. It is only necessary that the inlet passage 60 communicate with a substantial area of the elastomer core piece 42' so that the pressure pulses can be effectively absorbed without first being passed through the damping orifice. For example, the fluid inlet passage 60 could be located in the sidewall of the housing bore.

The elastomer preferred for the core piece is ethylene propylene diene monomer as it is readily available at a reasonable cost and is chemically compatible with brake fluid. Several elastomers are equally acceptable. Applicant has found that many elastomers have the same or substantially the same bulk modulus of compressibility as brake fluid. Also, certain plastics such as polypropylene and others will have the same compressibility characteristics as an elastomer, and be equally compatible with brake fluid and are therefore acceptable alternative materials. All of these can be categorized as polymeric materials and will include rubber (a thermoset) and thermoplastic elastomers and plastics. Other solid core materials may also be available. While it is preferred that the elastomer core piece and end cap be molded as an integral unit, such construction is merely a preferred construction. Further, the shape of the end cap may be modified from that of the cup shape shown in FIG. 5 to other possible shapes, including that of a flat disc.

While the best mode for carrying out the invention has been described in detail, those familiar with the art to which this invention relates will recognize various alternative designs and embodiments for practicing the invention as defined by the following claims.

What is claimed is:

1. In combination, a hydraulic control unit for a vehicle anti-lock brake system comprising:

a bore defining a chamber symmetrical about an axis and having a side wall and a bottom wall;

a fluid inlet passage and a fluid outlet passage, each passage being open to said bore from one of said bore walls;

a damping orifice of substantially restricted diameter relative to said inlet passage being disposed in said outlet passage and being in open communication with said inlet passage;

an attenuator seated within said chamber and sealed relative to said chamber to preclude the flow of brake fluid from said control unit;

said attenuator including a volumetrically compressible solid core member substantially filling the chamber and being in clearance relationship with a major portion of said chamber walls thereby providing means for exposing said attenuator on all sides having said clearance relationship to fluid pressure from said inlet passage;

whereby as the pressure of the brake fluid within the hydraulic control unit fluctuates, the volumetrically compressible attenuator core member absorbs the fluid pressure pulses, thereby allowing the damping orifice to attenuate the pressure pulses to the system.

2. The invention as described in claim 1 wherein the core member is a polymeric material.

3. The invention as described in claim 2 wherein the core member includes an annular seal rib of cylindrical cross-section as viewed in cross-section in a plane passing through said axis;

said annular seal rib being axially at the end of the core member opposite said inlet passage, and having a radial diameter extending from said axis exceeding the chamber diameter in an uncompressed state, thereby sealing the brake fluid from escaping the chamber.

4. The invention as described in claim 3 wherein said attenuator includes a cylindrical end cap symmetrical about said axis and of a substantially rigid material relative to said core member;

said end cap including a circumferentially extending, annular retaining shoulder; and retainer means located on said retaining shoulder for compressibly retaining said attenuator within said chamber.

5. The invention as described in claim 4 wherein said core member includes an annular compression rib extending about the periphery of said core member from an end wall thereof in the direction of said axis and being maintained in compression by the retaining means.

* * * * *